United States Patent [19]

Webster

[11] 4,358,750

[45] Nov. 9, 1982

[54] VEHICLE ALARM SYSTEM HAVING A VIBRATION-SENSITIVE MOTION DETECTOR

[76] Inventor: James B. Webster, 1121 S. Jackson St., Santa Ana, Calif. 92704

[21] Appl. No.: 953,199

[22] Filed: Oct. 20, 1978

Related U.S. Application Data

[63] Continuation-in-part of Ser. No. 721,511, Sep. 8, 1976, abandoned.

[51] Int. Cl.³ .............................................. B60R 25/00

[52] U.S. Cl. ........................................ 340/65; 340/63; 340/64; 340/527; 340/566; 73/517 R; 200/61.45 R; 307/10 AT

[58] Field of Search ..................... 340/65, 63, 64, 566, 340/527; 307/10 AT; 200/61.52, 61.45 R; 73/517 R, 570, 579, 599, 654, DIG. 1; 310/317, 316, 348, 358

[56] References Cited

U.S. PATENT DOCUMENTS

| | | | |
|---|---|---|---|
| 2,411,401 | 11/1946 | Welch | 73/517 R |
| 2,802,204 | 8/1957 | Kennelly et al. | 340/566 |
| 2,984,820 | 5/1961 | Kennell | 340/65 |
| 3,455,148 | 7/1969 | Foster et al. | 340/566 |
| 3,487,396 | 12/1969 | Perelman | 340/566 |
| 3,585,584 | 6/1971 | Behrend | 340/64 |
| 3,649,962 | 3/1972 | Bedard et al. | 340/64 |
| 3,691,549 | 9/1972 | Wilson | 340/527 |
| 3,713,127 | 1/1973 | Keledy et al. | 340/566 |
| 3,745,552 | 7/1973 | Wilt | 340/527 |
| 3,820,066 | 6/1974 | Kennell | 340/65 |
| 3,858,175 | 12/1974 | Kopera | 340/63 |
| 3,979,739 | 9/1976 | Birchall | 340/566 |

*Primary Examiner*—John W. Caldwell, Sr.
*Assistant Examiner*—Donnie Lee Crosland

[57] ABSTRACT

In a vehicle alarm system there is provided apparatus for producing a digital control signal that defines a command to initiate a timing operation such as an entry delay. The apparatus comprises a transducer, preferably including a piezoelectric device, for generating an electrical waveform that, while the vehicle is undergoing vibration, has an acceleration-representing analog signal component. The apparatus further comprises threshold-setting circuitry responsive to the electrical waveform for causing the initiate-timing command to be given when the acceleration representing signal component exceeds a predetermined threshold.

10 Claims, 3 Drawing Figures

HNT
21
20
44b
44a
Vcc
40
41
39
37
38
17
43
15
36
25
35
27
31
34
24
29
28
30
23
33
32
81
80
3
4
W1
W2
W3
W4
12
13
6
8

10
W3
W4
11
8

LOUD SPEAKER 50
VFO 70
71
49
Vcc
45
IC TIMER 52
IC TIMER 51

HNT

VEHICLE ALARM SYSTEM HAVING A VIBRATION-SENSITIVE MOTION DETECTOR

BACKGROUND OF THE INVENTION

This is a continuation-in-part of my co-pending application Ser. No. 721,511 filed on Sept. 8, 1976, now abandoned, and entitled VEHICLE ALARM SYSTEM HAVING A VIBRATION-SENSITIVE MOTION DETECTOR.

In general, this invention relates to vehicle alarm systems whose object is to prevent theft of the vehicle or contents thereof. More particularly, it relates to such a system having a vibration-sensitive motion detector.

The patent literature discloses various arrangements for alarm systems whose object is to prevent the theft of automobiles, campers, trucks or other vehicles. Representative patents disclosing such alarm systems include U.S. Pat. Nos. 3,829,829 and 3,930,226.

As is explained in U.S. Pat. No. 3,930,226, it is a desirable feature of such an alarm system to provide for arming and disarming the system automatically. In alarm systems having this automatic feature, there is included interval timing means adapted to receive as inputs at least first and second digital control signals, and further adapted to produce an alarm activation signal in the event that a predetermined delay period elapses between an initiate-timing command defined by the first digital control signal and an obviate-alarm command defined by the second digital control signal.

The obviate-alarm command defining signal may be derived from the ignition accessory switch. Thus, when the owner uses the ignition switch key, the obviate-alarm command is given to disarm the alarm system. To provide for giving an initiate-timing command, a variety of sensors such as door switches and the like may be used. Upon receiving an initiate-timing command as a result of a door opening, for example, the interval timing means begins to time out a delay interval called an entry delay. If it is the owner who has opened the door, he will in a short period of time, less than the entry delay, use the ignition key and thereby cause the obviate-alarm command to be given. If, on the other hand, it is a thief who has opened the door, the interval timing means will complete the entry delay period timing and then produce the alarm activation signal. A horn, warbler, or similar output device may be provided to respond to the alarm activation signal to sound an alarm to frighten the thief away. In addition or in the alternative, a radio transmitter may be provided to respond to the alarm activation signal to transmit an alarm signal to a remote radio receiver.

The interval timing means is also desirably adapted to time out a second type of delay interval called an exit delay. This gives the owner time to exit the vehicle after removing the ignition key before the alarm system is automatically rearmed, and thus he will not set off the alarm inadvertently when he opens the door to exit the vehicle.

In addition to the entry delay period and the exit delay period, it is advantageous to have the interval timing means arranged to time out two additional types of intervals. In particular, a power source such as a car battery would be unduly drained if it were used for a prolonged time to supply energization current to a horn or the like. To eliminate such undue draining of the battery, it is advantageous for the interval timing means to time out an alarm interval at the end of which it ceases giving the alarm activation signal. Finally, it is advantageous for the interval timing means to time out a rest period at the end of which it gives the alarm activation signal again.

It will be appreciated from the foregoing description of the desirable characteristics and features of the interval timing means that a difficult task is presented in seeking to provide all these features in a simple, relatively inexpensive arrangement.

A further difficult task is presented in seeking to provide apparatus for providing the initiate-timing command in a way that will foil attempts by thieves to disarm or otherwise thwart the alarm system. As has been noted in U.S. Pat. No. 3,772,646, thieves will, so as to thwart alarm systems which rely on door switch sensing, tow the vehicle to another location where they can get into the vehicle without fear that the alarm will be heard. To guard against this kind of resourcefulness on the part of thieves, various types of motion detectors have been proposed. The object of these motion detectors is to produce an initiate-timing command defining signal when the vehicle is jacked-up or otherwise moved. Some of the prior art motion detectors have had the drawback that they are attitude sensitive. The consequence of this disadvantage is that the alarm goes off simply because the vehicle is parked on a hill. Other types of motion detectors have had the drawback that they involve complicated mechanical structures that for various reasons are relatively expensive to manufacture and that do not lend themselves to sensitivity adjustment. In this connection, it should be borne in mind that a vehicle can undergo vibratory motion for a variety of reasons unrelated to tampering by a thief. For example, a passing truck or bus can cause a car parked nearby to undergo vibratory motion. If the sensitivity of the motion detector is very high, a problem can arise that the alarm will go off inadvertently under the foregoing exemplary circumstances. On the other hand, if the sensitivity of the motion detector is very low, other problems can arise. For example, thieves have been known to crawl under a parked car and then drill a hole in the car battery to disable it from providing operating power to an alarm system. Unless the motion detector is sufficiently sensitive to provide the initiate-timing signal in such circumstances, the thief can thwart the alarm system.

SUMMARY OF THE INVENTION

A vehicle alarm system which includes the present invention has improved apparatus for producing an initiate-timing command defining digital control signal.

The vehicle alarm system with which the improved apparatus is combined includes interval timing means adapted to receive as inputs the digital control signal produced by the improved apparatus and at least one other digital control signal that defines an obviate-alarm command such as that given when the ignition switch is turned on. The interval timing means is further adapted to produce an alarm activation signal in the event that a predetermined delay period elapses between the receipt of an initiate-timing command and the receipt of an obviate-alarm command.

Broadly, the improved apparatus comprises motion-sensing means for generating an electrical waveform that, while the vehicle is undergoing vibration as a result of being moved, has a acceleration-representing analog signal component. The improved apparatus further comprises threshold-setting circuit means responsive to the electrical waveform and including means which causes the initiate-timing command to be given when the acceleration-representing signal component exceeds a predetermined threshold.

The fact that the threshold-setting function is performed by circuit means rather than being an inherent characteristic of a mechanical structure is a distinguishing feature and an advantageous one with respect to simplicity of design, ease of manufacture, and capability of setting a desired threshold to distinguish between tampering-caused movement of the vehicle and other movement of the vehicle caused by normal ground shaking.

In the preferred embodiment of this invention, the motion sensing means comprises a piezo-ceramic device for generating the electrical waveform. The piezo-ceramic device has a disc configuration and is controlled by forces acting along the axis of the disc. A seismic mass is secured to the disc to cause forces to act along the axis of the disc when the seismic mass wobbles relative to the disc.

Further with respect to the preferred embodiment, the threshold-setting circuit means includes circuit means for filtering the electrical waveform to attentuate predetermined frequency components thereof, and further includes comparator circuit means responsive to the filtered electrical waveform for producing the initiate-timing command defining control signal.

Other preferred and advantageous features of the invention are described in detail below and brought out in the appended claims.

DETAILED DESCRIPTION

Figure 1:
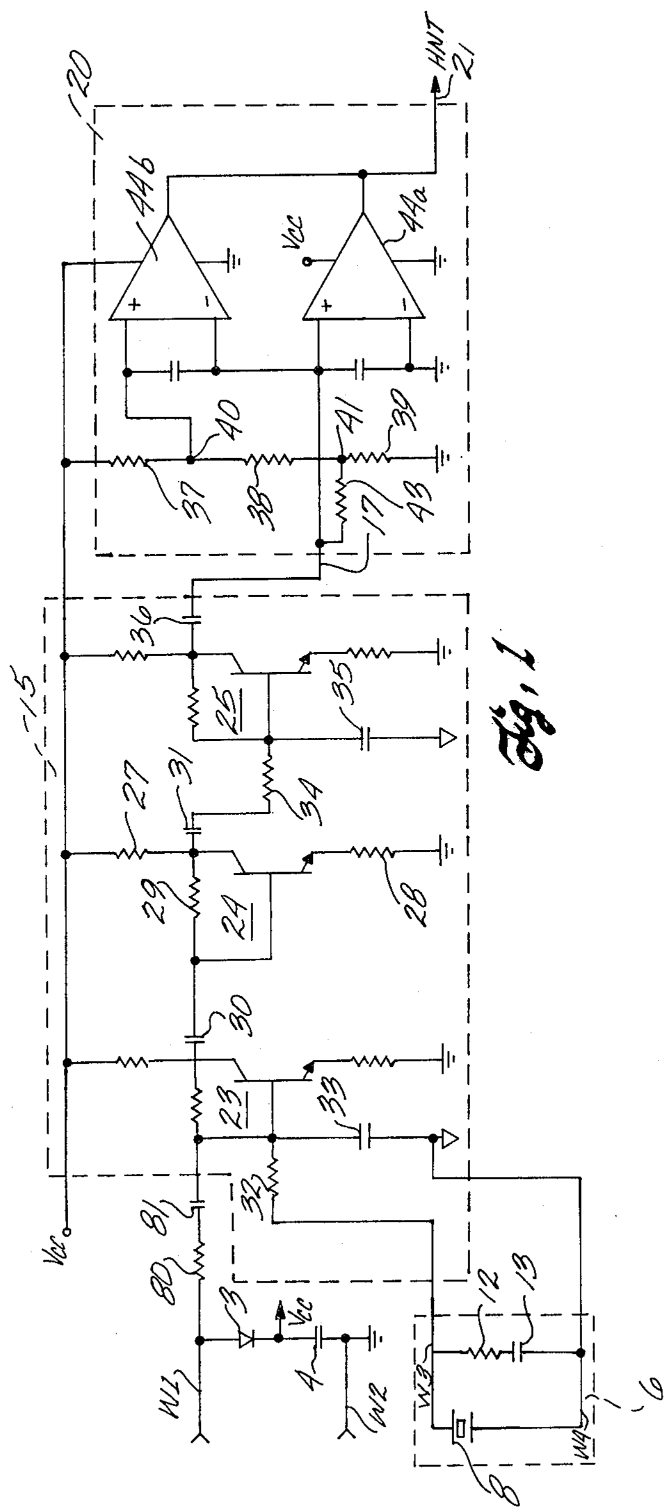
FIG. 1 is a schematic diagram showing the preferred arrangement of a portion of a vehicle alarm system embodying this invention, which portion provides a digital control signal to define an initiate timing command.

With reference to FIG. 1, a pair of wires W1 and W2 are provided for connection to a vehicle battery (not shown). The positive terminal of the battery forward biases a diode 3 and a voltage $V_{CC}$ is defined at the cathode of diode 3. A capacitor 4 is connected between the cathode of diode 3 and the negative terminal of the battery (ground).

Figure 3:
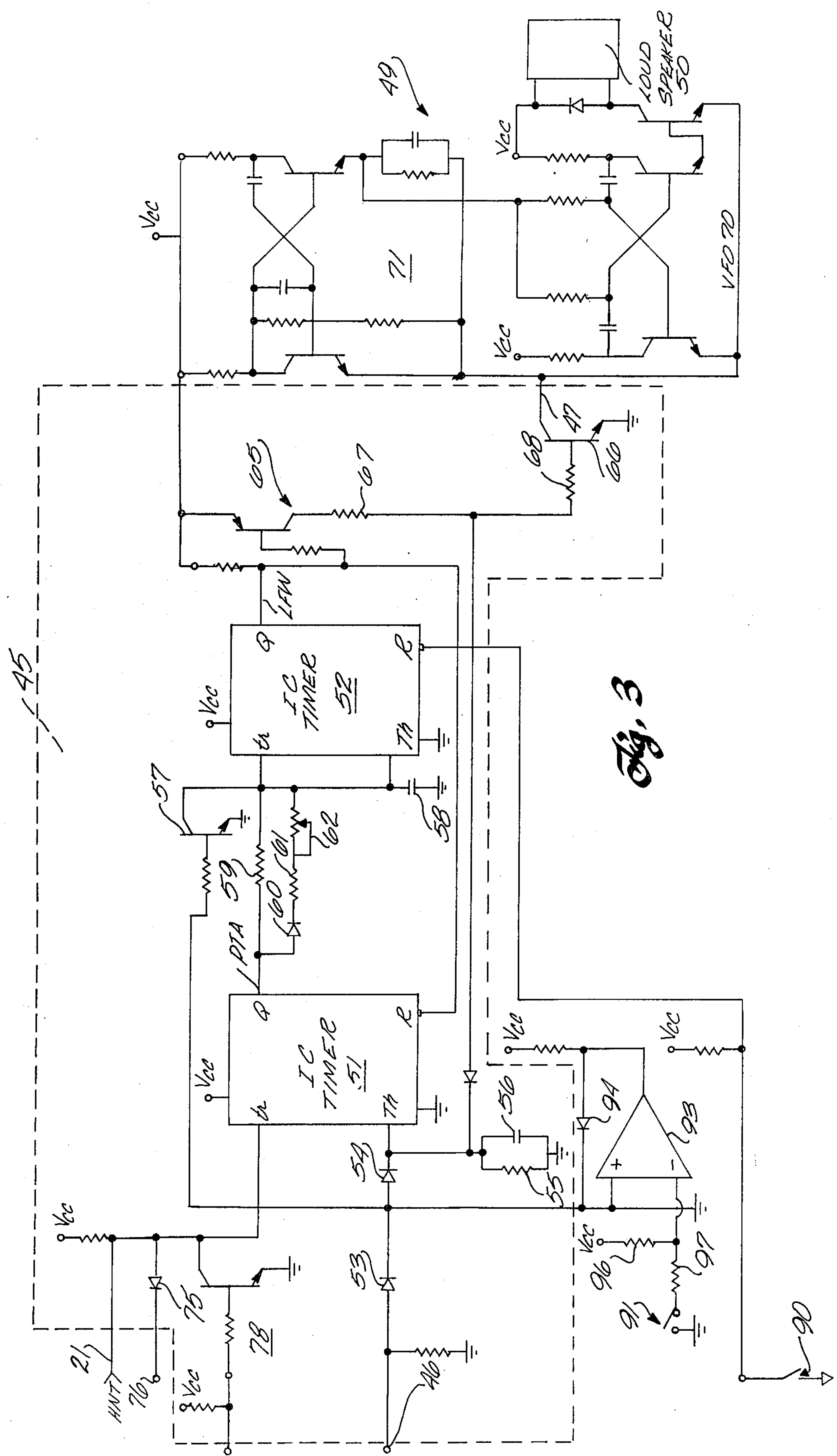
FIG. 3 is a block and schematic diagram showing the preferred arrangement of another portion of the preferred embodiment.

The voltage $V_{CC}$ produced at the cathode of diode 3 is applied by means of wires not shown to each of the points designated $V_{CC}$ in FIGS. 1 and 3.

Figure 2:
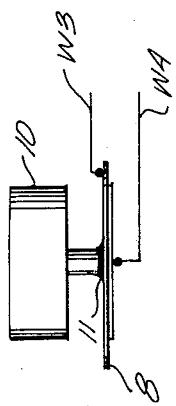
FIG. 2 is an elevation view of the piezoelectric transducer used in the preferred embodiment.

A transducer portion of the system is generally indicated at 6 in the schematic of FIG. 1. In the preferred embodiment, transducer portion 6 includes, as shown in FIG. 2, a piezo-ceramic device 8 and a seismic mass 10 bonded by an epoxy ring 11 or the like to device 8. Piezo-ceramic device 8 includes a thin disc-shaped brass plate portion, a thin disc shaped ceramic portion secured to the bottom surface of the brass plate, and a pair of wires W3 and W4. When piezo-ceramic device 8 is subjected to vibrating forces acting along the disc axis, an electrical waveform generated between wires W3 and W4 oscillates with a magnitude in accordance with the amount of the vibrating forces. A suitale piezo-ceramic device, which is sold by Edo Western Corp., Salt Lake City, Utah, has a scale factor, under open circuit loading conditions, of approximately 2 volts per oz. Piezo-ceramic device 8, by itself, can perform the function of an accelerometer, but only with respect to a single axis. In combination with seismic mass 10, however, accelerations with respect to any of the three orthogonal axes can be sensed, owing to the wobble motion of seismic mass 10 relative to piezo-ceramic device 8.

With reference again to FIG. 1, a trimming network comprising resistor 12 and capacitor 13 is connected between wires W3 and W4 in transducer portion 6. The component values for this trimming network are preferably selected to take into account unit to unit differences in characteristics of device 8. Typically, resistor 112 is a 500 K ohm resistor, and capacitor 13 is a 0.1 microfarad capacitor.

An active filter circuit portion of the system is generally indicated at 15 in the schematic of FIG. 1. Active filter circuit 15 responds to the electrical waveform generated by transducer portion 6, and produces a filtered electrical waveform on a signal lead 17. As is explained more fully below, in producing the filtered electrical waveform, active filter circuit 15 attenuates predetermined frequency components of the electrical waveform it receives from transducer portion 6. Significantly, the filtered electrical waveform has peak values that, while the vehicle is undergoing vibration as a result of being moved, exceed a predetermined threshold.

A comparator circuit portion of the system is generally indicated at 20. Comparator circuit 20 responds to the filtered electrical waveform to produce on a signal lead 21 a digital control signal referred to herein as HNT (as acronym for "High No Tampering"). So long as any peaks of the filtered electrical waveform has less than a predetermined threshold value, the HNT control signal is high (i.e., at or near $V_{CC}$). In the event that the peaks exceed the threshold value, comparator circuit 20 causes the HNT control signal to be low (i.e., at or near 0 volts), thereby giving an initiate-timing command.

Consider now the details of the active filter circuit used in the preferred embodiment. There are provided three identically biased transistor amplifier stages 23, 24, and 25. Inasmuch as the components affecting the biasing of these three stages are the same, only those for one (stage 24) bear detailed description. A collector resistor 27 suitably has a value of 15 K ohms, an emitter resistor 28 suitably has a value of 100 ohms, and a feedback resistor 29 suitably has a value of 1 Megohm. To effect interstage coupling, capacitors 30 and 31 are provided each of which suitably has a value of 1 microfarad. To effect coupling of the transducer output waveform to stage 23, there is provided a low pass filter comprising resistor 32 and capacitor 33. In the preferred embodiment, resistor 32 has a value of 1 Megohm and capacitor 33 has a value of 10 microfarads. To provide further attentuation of high frequency components, stage 25 includes a low pass filter comprising resistor 34 and capacitor 35. In the preferred embodiment, resistor 34 has a value of 1 Megohm and capacitor 35 has a value of 10 microfarads. To effect coupling of stage 25 to comparator circuit 20 there is provided a capacitor 36 which suitably has a value of 10 microfarads.

An active filter 15 having the foregoing component values has been tested and found to have a frequency response whereby its gain in db from the input voltage applied via wires W3 and W4 to its output voltage at signal lead 17 varies with frequency as shown in the table below.

FREQUENCY RESPONSE TABLE

| Frequency in Hz | Gain in db |
|---|---|
| 0.2 | −19.2 |
| 0.3 | −11.7 |
| 0.4 | −6.7 |
| 0.5 | −3.4 |
| 0.6 | −1.5 |
| 0.7 | +0.3 |
| 0.8 | +1.0 |
| 0.9 | +1.6 |
| 1.0 | +1.9 |
| 1.1 | +2.3 |
| 1.2 | +2.3 |
| 1.3 | +2.1 |
| 1.4 | +2.0 |
| 1.5 | +1.9 |
| 1.6 | +1.7 |
| 1.7 | +1.6 |
| 1.8 | +1.3 |
| 1.9 | +1.0 |
| 2.0 | 0.8 |
| 3.0 | −1.5 |
| 4.0 | −4.5 |
| 5.0 | −7.0 |
| 6.0 | −8.9 |
| 40.0 | −34.0 |

It will be appreciated from the data given above that active filter circuit 15 operates as a band-pass filter with its maximum gain being at a frequency close to 1 Hz. For frequencies substantially different from 1 Hz, active filter circuit 15 provides substantial attenuation. It has been found that such band-pass filtering is advantageous with respect to discriminating between tampering-caused motion of the vehicle and other incidental motions.

Consider now the details of the comparator circuit used in the preferred embodiment. There is provided a voltage divider network comprising resistors 37, 38, and 39 and defining nodes 40 and 41. Resistors 38 and 39 have the same value, suitably 22 ohms, and resistor 37 has a much higher value, suitably 22 K ohms. Coupling resistor 43 is connected between node 41 and signal lead 17. Coupling resistor 43 suitably has a value of 10 K ohm. With the above-mentioned component values and with a typical battery voltage of 12 volts, signal lead 17 is biased at 12 mv (millivolts) and node 40 is biased at about 24 mv. A differential input circuit **44*a* has a non-inverting input (+) connected to signal lead 17 and an inverting input (−) connected to ground. An identical differential input circuit 44*b* has its non-inverting input connected to node 40 and its inverting input connected to signal lead 17. In the preferred embodiment, an integrated circuit (I.C.) called a quad comparator is used which includes four such differential input circuits. The quad comparator is sold by various I.C. manufacturers under the standard designation MC3302P. Each of the differential input circuits has an output adapting it for use in the well known wired-OR configuration. When the voltage level at its non-inverting input is negative with respect to the voltage level at its inverting input, the differential input circuit sinks current at its output. In the preferred embodiment, circuits 44*a* and 44*b*** each have a capacitor connected in parallel with its differential input to prevent power supply spikes and the like from causing the false commands. Each of these capacitors suitably has a value of 0.001 microfarads.

In typical circumstances of operation, the voltage level at signal lead 17, owing to the d.c. biasing, is positive. For the same reason, the voltage level at node 40 is positive with respect to the voltage level at signal lead 17. Accordingly, neither circuit **44*a* nor circuit 44*b* sinks current at its output under these circumstances. On the other hand, when the filtered electrical waveform produced on signal lead 17 has a peak-to-peak amplitude in excess of approximately 25 mv, circuits 44*a* and 44*b*** alternately sink current on successive peaks, which causes the HNT control signal to go low thereby defining the initiate-timing command.

Consider now FIG. 3. An interval timing means is generally indicated at 45. Timing means 45 has an input connected to signal lead 21 which carries the initiate-timing command defining signal (HNT). It has an input 46 for receiving an obviate-alarm command defining signal, and its has other inputs described below. The output of timing means 45 is an alarm activation signal provided on a signal lead 47.

A warbler drive circuit arrangement, generally indicated at 49, responds to the alarm activation signal, and supplies energization current to a loudspeaker 50.

As to the details of interval timing means 45, there are provided two 555 I.C. timers 51 and 52, which are sold by National Semiconductor Corporation. Each 555 I.C. timer has two terminals for receiving operating power, a trigger input (tr), a threshold input (Th), a reset input (R), an output Q, and other terminals (not shown such as a control voltage terminal) which are not used in this circuit arrangement. Each 555 timer has the following characteristics. When the voltage level applied to the threshold input exceeds two-thirds of $V_{CC}$, the 555 timer is in a reset state whereby its Q output is low (i.e., at or near ground). As for the 555 timers manufactured by National Semiconductor Corporation, the foregoing is true irrespective of the trigger input. When the voltage level applied to the threshold input is less than two-thirds of $V_{CC}$ and the voltage level applied to the trigger input is less than one-third of $V_{CC}$, the 555 timer is in a set state whereby its Q output is high (i.e., at or near $V_{CC}$). When intermediate level voltages are applied are applied to the trigger and threshold inputs (e.g. one-half of Vcc to both), the 555 timer exhibits memory whereby its state depends on past history.

Timer 51 has its trigger input connected to signal lead 21 to render it responsive to initiate-timing commands. It has its threshold input connected through a pair of diodes 53 and 54 to input 46 to render it responsive to obviate-alarm commands. A resistor 55 and a capacitor 56 form a timing network connected to the threshold input of timer 51. At the Q output produced a PTA (an acronym for "Preparing To Alarm") control signal.

The trigger and threshold inputs of timer 52 are each connected to the collector of a transistor 57, and each is responsive to a voltage developed across a capacitor 58. A resistor 59 is connected between the Q output of timer 51 and the trigger input of timer 52. A series circuit comprising a diode 60, a resistor 61 and a potentiometer 62 is connected in parallel with resistor 59. At the Q output of timer 52, there is produced a LFW (an acronym for "Low For Warble") control signal. A transistor switching stage generally indicated at 65 complements the LFW control signal and provides base current drive for a transistor 66 through resistors 67 and 68. When transistor 66 turns on, it sinks current and this defines the alarm activation signal.

The duration of the entry delay defined by timing means 45 is adjustable owing to the provision of potentiometer 62. With capacitor 58 being 100 microfarads, resistor 59 being 1 Megohm, resistor 61 being 10 K, and potentiometer 62 being adjustable from 0 ohm to 500 K, the entry delay can be adjusted to the owner's desire in a range between approximately 2.5 seconds and approximately 90 seconds. The duration of the exit delay defined by timing means 45 depends upon resistor 55 and capacitor 56. With resistor 55 being 1 Megohm and capacitor 56 being 100 microfarads, approximately 60 seconds are given for the exit delay.

Consider now an example of operation in which the alarm activation signal is produced. As initial conditions for this example, timer 51 is in its reset state (i.e., PTA is low); no obviate-alarm command has recently been given (i.e., capacitor 56 is discharged; and timer 52 is in its set state (i.e., LFW is high). At the outset, the HNT signal goes low thereby defining an initiate-timing command. This immediately triggers timer 51 into its set state and the PTA signal goes high. In response, capacitor 58 begins to charge, and the voltage level applied to the threshold input of timer 52 eventually exceeds two-thirds of $V_{CC}$. When it does, timer 52 immediately enters its reset state, and the LFW signal goes low. This causes transistor 66 to turn on so as to give the alarm activation signal. At the same time that transistor 66 turns on, the LFW signal, which is also applied to the reset input of timer 51, causes timer 51 to re-enter its reset state. When timer 51 re-enters its reset state, the PTA signal goes low and diode 60 becomes reverse-biased. Thus, capacitor 58 discharges only through resistor 59 whereas it had been charged also through the series network including diode 60. After a predetermined alarm period (approximately 120 seconds long in the preferred embodiment), the voltage across capacitor 58 decays to one-third of $V_{CC}$. At this point, the trigger input of timer 52 responds with the result that timer 52 re-enters its set state.

At the instant which marks the end of the alarm period, the LFW signal goes high and this turns off stage 65. This of course also causes a high level input to be applied to the reset input of timer 51. For at least a brief holding interval, however, timer 51 remains in its reset state. This is so because of a diode feeback path from the junction of resistors 67 and 68 to the threshold input of timer 51. While stage 65 is on (during the alarm period), resistors 67 and 68 serve as a voltage divider for supplying a voltage slightly in excess of two-thirds of $V_{CC}$. With a typical battery voltage of 12 volts, and with resistor 68 being 6.8 K and resistor 67 being 2.2 K capacitor 56 charges to approximately 8.5 volts during the alarm period. Until capacitor 56 has discharged below two-thirds of $V_{CC}$ (approximately 8 volts), timer 51 does not respond to a trigger input.

In circumstances in which an initiate-command is being given at the end of the above-described holding interval, timer 51 is again triggered to enter its set state. In response, capacitor 58 again receives charging current. At this stage of operation, in contrast to the initial stage of operation, capacitor 58 begins charging from one-third of $V_{CC}$. Thus, a shorter time delay is required to cause capacitor 58 to charge up to two-thirds of $V_{CC}$. It will be appreciated from the foregoing that under circumstances in which a continuous initiate-timing command is given, interval timing means defines alternating periods of time (i.e., an alarm period and a rest period) during which the alarm activation signal is and is not given respectively. The owner can terminate this sequence of operation by using the ignition switch key so as to give an obviate-alarm command. As soon as the obviate-alarm command is given, transistor 57 conducts thereby short circuiting capacitor 58 and, in response, timer 52 enters its set state.

As to the warbler drive circuitry 49, this includes a conventional variable frequency oscillator (VFO) 70 and a relatively low frequency astable multivibrator 71 whose output controls the frequency of VFO 70.

In the preferred embodiment, provision is made for causing the initiate-timing command to be given in circumstances in addition to those described above with respect to the motion detector. With reference to FIG. 3, there is provided a diode 75 having its anode connected to the trigger input of timer 51 and its cathode connected to an input terminal 76. When an external door switch or the like, which defines a conventional open loop input, connects input terminal 76 to ground, an initiate-timing command is given. The response of interval-timing means 45 to this initiate-timing command is the same as its response to the initiate-timing command given by the motion detector. To provide for accepting a conventional closed loop input such as is defined by a door switch that opens when the door opens, there is included a conventional buffer inverting stage 78. With reference to FIG. 1, there is provided a resistor 80 and a capacitor 81 for rendering active filter circuit 15 responsive to a rapid change in the battery voltage. When a circuit load such as a dome light or the like is switched in to drain current from the battery incident to a door opening, the voltage level at wire W1 changes. With resistor 80 being 110 ohms and capacitor 81 being 0.1 microfarads, this change, as amplified by active filter 15, is sufficient to cause comparator 20 to give the initiate-timing command.

It will be recalled that, in describing FIG. 3, reference was made to an exit delay. When the owner turns off the ignition key switch, the voltage at input terminal 46 changes from approximately 12 volts to ground. Capacitor 56 will have been charged to approximately 11 volts, however, and will begin to discharge through resistor 55. Approximately 60 seconds is required for this discharging to proceed to the point that the voltage level at the threshold input of timer 51 falls below two-thirds of $V_{CC}$. During this exit delay, the owner can leave the vehicle, and any initiate-timing commands caused by his opening and closing a door or otherwise shaking the vehicle, will not result in an inadvertent alarm.

In some circumstances, it is desirable to give an immediate alarm, as in a panic or emergency situation. Accordingly, in the preferred embodiment, there is provided a manual switch 90 for grounding the reset input of timer 52. When the owner closes switch 90, timer 52 immediately responds by causing the LFW signal to go low with the result that an alarm is given.

In other circumstances, as during vehicle maintenance, it is desirable to disarm the vehicle alarm system. A disarm switch 91, such as toggle switch, when closed at a time when the obviate-alarm command is being given, is effective to disarm the system. While the obviate-alarm command is being given, the voltage level at the non-inverting input of a differential circuit 93 is approximately 11.5 volts. Preferably, one of the four independent circuits included in the above-mentioned quad comparator is used as differential input circuit 93. With disarm switch 91 open, the voltage level at the inverting input is approximately 12 volts, and thus circuit 93 sinks current and a diode 94 is reverse biased. By closing disarm switch 91, current is caused to flow through a voltage divider network comprising resistors 96 and 97, whereby the voltage level at the inverting input drops to approximately 6 volts. Thus, circuit 93 ceases to sink current, and owing to the provision of diode 94 in a feedback path, circuit 93 latches up, and there is provided a voltage level which simulates the obviate-alarm command. Thus, the ignition key can be removed without inadvertently causing an alarm to be given. The system can be rearmed simply by opening disarm switch 91.

A variety of modifications can be made to the above-described preferred embodiment without departing from the broad scope of the present invention. In this connection, the multi-stage arrangement of discrete components in the active filter circuit is preferred because of the low cost of transistors. A slightly more expensive integrated circuit operational amplifier with external filtering componments can of course provide the equivalent function. As to the transducer portion, the piezoelectric crystal used therein is particularly advantageous from the point of view of both low cost and effective performance. However, other types of transducers can be used without sacrificing other important advantages of the invention, such as the feature of setting the threshold by circuit means. It will be appreciated that other types of transducers may produce waveforms whose spectrum includes frequency components (e.g. at very low frequencies down to d.c.) that are representataive of position rather than acceleration. Such frequency components are of no concern because of the attenuation provided by the active filter.

I claim:

1. An alarm system for a vehicle which is subject to acceleration and motion which may be induced by tampering or natural causes, said alarm system comprising:

acceleration sensing means responsive to vehicle acceleration to provide an acceleration signal having an amplitude and frequency which vary with characteristics of the acceleration of the vehicle;

said acceleration sensing means including a piezo-ceramic device for generating said acceleration signal and a seismic mass coupled to the piezo-ceramic device;

bandpass filter means for attenuating frequencies of the acceleration signal induced by said natural causes and passing preselected frequencies of the acceleration signal induced by said tampering to provide a filtered acceleration signal, substantially all of said preselected frequencies being less than 40 Hertz;

first means responsive to the amplitude of the filtered acceleration signal being above a predetermined level for providing an initiate timing signal;

interval timing means responsive to the initiate timing signal to provide an alarm activation signal; and means responsive to at least one predetermined condition for inhibiting the interval timing means to prevent the interval timing means from providing the alarm activation signal.

2. An alarm system as defined in claim 1 wherein said seismic mass renders said piezo-ceramic device responsive to acceleration of the vehicle along any one of a plurality of axes.

3. An alarm system as defined in claim 1 wherein the vehicle has a battery and said bandpass filter means includes means responsive to a change in the battery voltage to provide said filtered acceleration signal having at least said predetermined level.

4. An alarm system as defined in claim 1 wherein the interval timing means provides the alarm activation signal after a timing interval and the interval timing means includes two timer circuits and a plurality of timing networks arranged to provide for timing at least four separate timing intervals.

5. An alarm system as defined in claim 1 wherein said bandpass filter means attenuates frequencies of 0.6 Hz and less and frequencies equal to or greater than 3 Hz.

6. An alarm system as defined in claim 1 wherein said first means includes comparator means for providing the initiate timing signal in digital form when the amplitude of the filtered acceleration signal is above said predetermined level.

7. An alarm system as defined in claim 1 wherein said seismic mass includes an enlarged head and a stem for coupling the head to the piezo-ceramic device.

8. An alarm system as defined in claim 1 wherein the interval timing means includes means responsive to a control signal for immediately giving the alarm activation signal.

9. An alarm system as defined in claim 2 wherein the vehicle has a battery and said bandpass filter means includes means responsive to a change in the battery voltage to provide said filtered acceleration signal having at least said predetermined level, said first means includes comparator means for providing a digital initiate timing signal when the amplitude of the filtered acceleration signal is above said predetermined level.

10. An alarm system as defined in claim 7 wherein the bandpass filter means attenuates frequencies of 0.6 Hz and less and frequencies equal to or greater than 3 Hz and wherein the interval timing means provides the alarm activation signal after a timing interval and the interval timing means includes a plurality of timer circuits and a plurality of timing networks arranged to provide for timing a plurality of separate timing intervals.

* * * * *